(12) United States Patent
Robert et al.

(10) Patent No.: US 6,562,923 B1
(45) Date of Patent: May 13, 2003

(54) PROCESS FOR THE PREPARATION OF A DILITHIATED INITIATOR AND ANIONIC POLYMERIZATION PROCESS

(75) Inventors: Pierre Robert, Perignat les Sarlieve (FR); Corinne Fradin-Cohas, Clermont-Ferrand (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/145,287

(22) Filed: May 13, 2002

Related U.S. Application Data

(63) Continuation of application No. PCT/EP01/09856, filed on Aug. 27, 2001.

(30) Foreign Application Priority Data

Sep. 11, 2000 (FR) .............................................. 00 11617

(51) Int. Cl.$^7$ ................................ C08F 4/48; C07F 1/02
(52) U.S. Cl. ................... 526/173; 260/665 R; 502/157; 525/271; 525/314
(58) Field of Search ................... 260/665 R; 502/157; 526/173, 180; 525/271, 314

(56) References Cited

U.S. PATENT DOCUMENTS

| | | | |
|---|---|---|---|
| 3,674,895 A | * 7/1972 | Gaeth et al. | ............ 260/665 R |
| 4,172,100 A | 10/1979 | Tung et al. | |
| 4,172,190 A | 10/1979 | Tung et al. | |
| 4,196,154 A | 4/1980 | Tung et al. | |
| 4,960,842 A | 10/1990 | Lo et al. | |
| 5,464,914 A | 11/1995 | Lo et al. | |
| 5,561,210 A | 10/1996 | Roy | |
| 5,595,951 A | * 1/1997 | Halasa et al. | ................ 502/154 |
| 5,750,055 A | 5/1998 | Van Der Steen et al. | |

FOREIGN PATENT DOCUMENTS

| | | |
|---|---|---|
| EP | 316857 | 5/1989 |
| WO | 0022004 | 4/2000 |

OTHER PUBLICATIONS

IPC Business Press, G. Gordon Cameron and Gavin M. Buchan, "*Addition of sec–butyllithium to m–diisopropenylbenzene,*" vol. 20, pp. 1129–1132, Sep. 1979, *Polymer*.

R.P. Foss, H.W. Jacobson, and W.H. Sharkey, "*A New Difunctional Anionic Initiator*", vol. 10, No. 2, pp. 287–291, Mar.–Apr. 1977, *Macromolecules*.

American Chemical Society, Y.S. Yu, Ph., Dubois, R. Jérôme, and Ph. Teyssié, "*Difunctional Initiators Based on 1, 3–Diisopropenylbenzene. Synthesis of a Pure Dilithium Adduct and Its Use as Difunctional Anionic Polymerization Initiator*", vol. 29, No. 8, pp. 2738–2745, 1996, *Macromolecules*.

* cited by examiner

Primary Examiner—Fred Teskin
(74) Attorney, Agent, or Firm—Baker Botts L.L.P.

(57) ABSTRACT

The present invention relates to a process for the preparation of a dilithiated initiator usable in anionic polymerization, a process for the preparation by anionic polymerization of a living diene elastomer which is provided with a carbon-lithium group at each of its chain ends, and a process for the preparation of a copolymer having three blocks starting from said living diene elastomer. The process for the preparation of a dilithiated initiator according to the invention involves of reacting a first reagent, a dialkenyl benzene, and a second reagent, secondary butyllithium, in the presence of a diamine, in an aliphatic or alicyclic hydrocarbon solvent, such that the ratio of the number of moles of first reagent to the number of moles of second reagent is substantially equal to 0.5, so that the initiator obtained is essentially a bi-adduct resulting from the addition of a molecule of secondary butyllithium to each of the two double bonds in the dialkenyl benzene.

15 Claims, 2 Drawing Sheets

PROCESS FOR THE PREPARATION OF A DILITHIATED INITIATOR AND ANIONIC POLYMERIZATION PROCESS

This is a continuation of PCT/EP01/09856, filed Aug. 27, 2001, published in French on Mar. 14, 2002, as WO02/20623, which claims priority to French Patent Application No. FR 00/11617, filed Sep. 11, 2000.

INTRODUCTION

The present invention relates to a process for the preparation of a dilithiated initiator usable in anionic polymerization, a process for the preparation by anionic polymerization of a living diene elastomer which is provided with a carbon-lithium group at each of its chain ends, and a process for the preparation of a copolymer having three blocks starting from said living diene elastomer.

BACKGROUND OF THE INVENTION

The preparation of dilithiated polymerization initiators has been amply described in the literature. The main difficulty which is encountered in this preparation is to obtain initiators which are effectively bifunctional, that is to say are such that they permit equi-reactivity of the carbon-lithium sites during anionic polymerization reactions using these initiators.

The first methods of preparing such dilithiated initiators involved the coupling of radical anions.

Mention may be made, for example, of the preparation of 1,4-dilithiotetraphenyl butane, from a precursor consisting of 1,1-diphenylethylene (L. J. Fetters and M. Morton, Macromolecules 2, 453, 1969).

The main disadvantage of this first method of preparation lies in the necessity of using metallic lithium, which represents a difficulty when extrapolating to an industrial scale. Furthermore, the precursor used is very expensive and addition of monolithiated compounds to a di-unsaturated compound.

Examples of such di-unsaturated compounds include compounds bearing two diphenylethylene units, such as 1,3-bis(1-phenylethenyl) benzene (L. H. Tung and G. Y. S. Lo, Macromolecules 27, 1680, 1994).

To this end, international patent specification WO-A-89/04843 discloses a process for the preparation of a dilithiated initiator consisting of reacting, in cyclohexane, secondary butyllithium with 1,3-bis(1-phenylethenyl)benzene in stoichiometric quantities. In order to make the initiator thus prepared have a bifunctional nature during polymerization, it should be noted that a polyamine must later be introduced into the polymerization medium.

One major disadvantage of this second method of preparation lies in the lack of availability of the precursors for use on an industrial scale.

The use of aromatic di-unsaturated type precursors (such as divinylbenzene, or alternatively 1,3-diisopropenylbenzene) makes it possible to overcome this disadvantage.

Thus, the reaction between the 1,3-diisopropenylbenzene and the secondary butyllithium has been widely studied. Two examples of implementation of this reaction may be mentioned. In the first example, R. P. FOSS et al. (R. P. Foss et al., Macromolecules 10, 287, 1977) proposed an initiator obtained in the presence of 1,3-diisopropenylbenzene, secondary butyllithium and 0.1 lithium equivalent of triethylamine. This initiator is obtained in the form of α,ω-dilithiated oligo-isoprene, in order to solubilize it in a non-polar medium. Said initiator was used for the preparation of polymers obtained anionically, and the effectively bifunctional behavior of this initiator was concluded on the basis of the number-average molecular weights and the monomodal distributions of molecular weights which were obtained for these polymers.

However, G. Gordon Cameron and G. M. Buchan (Polymer 20, 1129, 1979) report that molecular weights and distributions of molecular weights indicate only average functionality for the two carbon-lithium sites of the initiator. These elements of macrostructure do not constitute a sufficient condition for defining the equi-reactivity of these sites during polymerization, that is to say, the effective bifunctionality of the initiator.

In fact, the aforementioned monomodal nature for the distributions of molecular weights can be explained using the hypothesis that the polymerization kinetics of each of the initiating types present (i.e. residual monolithiated compound, dilithiated compound, polylithiated compounds resulting from the oligomerization of 1,3-diisopropenylbenzene) are compensated.

In the second example of implementation of the reaction between the 1,3-diisopropenylbenzene and the secondary butyllithium, U.S. Pat. No. 5,464,914 discloses the addition of 10 lithium equivalents of triethylamine to obtain a dilithiated initiator. In order to make the initiator with a bifunctional nature during polymerization, it should be noted that a polyamine must later be introduced into the polymerization medium.

In fact, the polarity provided by the triethylamine is not sufficient to dissociate the C-Li sites borne by the molecule of initiator, i.e. to reveal the bifunctional nature of the initiator.

Ph. TEYSSIE et al. discloses the preparation of a dilithiated initiator by reaction of 1,3-diisopropenylbenzene with tert. butyllithium, in stoichiometric quantities and in the presence of 1 lithium equivalent of triethylamine and at −20° C. (Ph. Teyssie et al., Macromolecules 29, 2738, 1996), such that the 1,3-diisopropenylbenzene is added drop by drop to a tert. butyllithium/triethylamine solution.

The use of tert. butyllithium, instead of secondary butyllithium, overcomes a disadvantage inherent in the use of secondary butyllithium, i.e. the production in a large quantity of oligomers. In fact, since tert. butyllithium is more reactive than secondary butyllithium, the reaction of the 1,3-diisopropenylbenzene with the tert. butyllithium is thus preferentially oriented towards addition of the lithiated compound to each of the two unsaturated sites borne by the diisopropenylbenzene.

The size exclusion chromatography technique ("SEC" technique) made it possible to establish the absence of oligomers of 1,3-diisopropenylbenzene, and the $^7$Li NMR technique demonstrated the substantially total consumption of the tert. butyllithium.

It will also be noted that the 1,3-diisopropenylbenzene/tert. butyllithium molecule thus obtained only behaves like a bifunctional initiator upon polymerization, i.e. equi-reactivity of the carbon-lithium sites, if a sufficient quantity of a polar compound, for example, tetrahydrofuran, is added.

International patent specification WO-A-00/22004 discloses a process for the preparation of a dilithiated initiator consisting of reacting diisopropenylbenzene with diethyl ether, then adding the mixture thus obtained to a secondary or tertiary alkyllithium. The reaction of said mixture with a secondary alkyllithium is effected at a temperature of

SUMMARY OF THE INVENTION

The present invention relates to a process for the preparation of a dilithiated initiator usable in anionic polymerization, a process for the preparation by anionic polymerization of a living diene elastomer which is provided with a carbon-lithium group at each of its chain ends, and a process for the preparation of a copolymer having three blocks starting from said living diene elastomer.

DETAILED DESCRIPTION OF THE INVENTION

Figure 1:
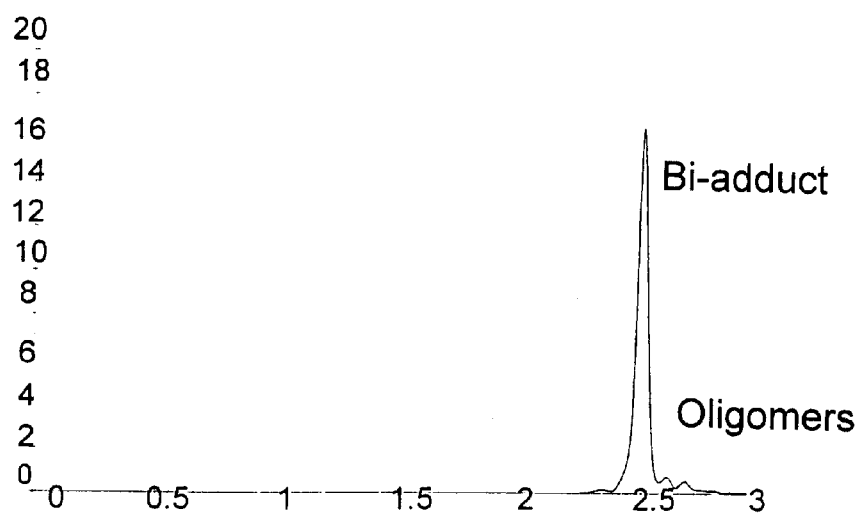
FIG. 1 is a graph illustrating the curve of distribution of molecular weights for an initiator prepared according to the invention.

The Inventors have surprisingly discovered that if a first reagent, dialkenyl benzene, and a second reagent, secondary butyllithium, are reacted in the presence of a diamine, in an aliphatic or alicyclic hydrocarbon solvent, such that the ratio of the number of moles of first reagent to the number of moles of second reagent is substantially equal to 0.5, a dilithiated initiator is obtained which is essentially a bi-adduct having a molecule of secondary butyllithium added to each of the two double bonds borne by the dialkenyl benzene. The initiator so formed is effectively bifunctional, in the sense that the carbon-lithium sites with which it is provided are equi-reactive during later anionic polymerization.

Cyclohexane, for example, is used as aliphatic hydrocarbon solvent.

Preferably 1,3-diisopropenylbenzene is used as dialkenyl benzene (first reagent).

As far as said second reagent is concerned, it will be noted that an essential advantage of the present invention is to use secondary butyllithium, which is a compound that is less expensive than tert. butyllithium and therefore lends itself better to extrapolation to an industrial scale.

As far as the diamines which, according to the invention, have to be used to obtain said initiator are concerned, mention may be made, preferably, of the diamines belonging to the group consisting of tetramethylethylenediamine and tetraethylethylenediamine. These two preferred diamines both constitute multidentate chelating agents which are characterized by a similar chemical structure and activity.

According to another embodiment of the invention, the first reagent is added to the second reagent in a single step in its entirety, then the diamine is introduced into a reaction mixture comprising said reagents. It will be noted that this addition of the first reagent in a single step in its entirety constitutes a simplified operating method, in comparison to a method of adding the first reagent drop-by-drop.

According to an embodiment of the invention, when tetramethylethylenediamine is used as diamine, the two reagents are reacted in the presence of a quantity of diamine which may vary from about 0.5 to 1 lithium equivalent, and advantageously substantially equal to 1 lithium equivalent, and at a temperature which may vary from about −20° C. to 50° C.

It will be noted that the use of tetramethylethylenediamine constitutes a preferred embodiment of the invention.

According to another embodiment of the invention, when tetraethylethylenediamine is used as diamine, said reagents are reacted in the presence of a quantity of diamine which is substantially equal to 1 lithium equivalent, and at a temperature which varies from about −20° C. to 50° C.

A dilithiated initiator according to the invention is obtained by carrying out the aforementioned operations. This initiator comprises a bi-adduct which results from the addition of a molecule of secondary butyllithium to each of the two double bonds borne by the dialkenyl benzene. The bi-adduct is present in the initiator in a mass fraction equal to or greater than 75% and, preferably, equal to or greater than 90%.

In fact, the oligomeric types (oligomers of dialkenyl benzene) are advantageously present in the initiator in a total mass fraction which is less than or equal to 25% and, preferably, less than or equal to 10%, and the residues of said reagents are for their part advantageously present in said initiator in a mass fraction of less than 2% and, preferably, less than 1%, which imparts to the initiator according to the invention a high degree of purity of the bi-adduct.

According to the invention, a process for the preparation by anionic polymerization of a living diene elastomer which has a carbon-lithium group at each of its chain ends is provided, said process comprising of reacting, in an aliphatic or alicyclic hydrocarbon solvent, at least one conjugated diene monomer with a dilithiated initiator, wherein the dilithiated initiator is an initiator obtained by the process of the invention, so that the lithium groups of said initiator are equi-reactive during polymerization.

"Diene elastomer" is understood to mean, in known manner, an elastomer resulting at least in part, i.e. a homopolymer or a copolymer, from diene monomers (monomers bearing two double carbon-carbon bonds, whether conjugated or not).

Preferably, the diene elastomer prepared according to the process of the invention belongs to the category of "essentially unsaturated" diene elastomers, that is to say those which have resulted at least in part from conjugated diene monomers, having a content of members or units of diene origin, i.e. conjugated dienes, which is greater than 15% (mole %).

Such an "essentially unsaturated" diene elastomer may be formed of any homopolymer obtained by polymerization of a conjugated diene monomer having 4 to 12 carbon atoms, or any copolymer obtained by copolymerization of one or more conjugated dienes together or with one or more vinyl-aromatic compounds having 8 to 20 carbon atoms.

Even more preferably, the diene elastomer prepared according to the process of the invention belongs to the category of "highly unsaturated" diene elastomers, that is to say those having a content of units of diene origin, i.e. conjugated dienes, which is greater than 50%.

Suitable conjugated dienes are, in particular, 1,3-butadiene, 2-methyl-1,3-butadiene, 2,3-di(C1 to C5 alkyl)-1,3-butadienes such as, 2,3-dimethyl-1,3-butadiene, 2,3-diethyl-1,3-butadiene, 2-methyl-3-ethyl-1,3-butadiene, 2-methyl-3-isopropyl-1,3-butadiene, an aryl-1,3-butadiene, 1,3-pentadiene and 2,4-hexadiene.

Suitable vinyl-aromatic compounds are, for example, styrene, ortho-, meta and para-methylstyrene, the commercial mixture "vinyltoluene", para-tert. butylstyrene, methoxystyrenes, chlorostyrenes, vinylmesitylene, divinylbenzene and vinylnaphthalene.

Particularly preferably, the diene elastomer according to the invention, a highly unsaturated diene elastomer selected from the group consisting of polybutadienes (BR), polyisoprenes (IR) or natural rubber (NR), butadiene-styrene copolymers (SBR), butadiene-isoprene copolymers (BIR), isoprene-styrene copolymers (SIR), butadiene-styrene-isoprene copolymers (SBIR), and a mixture of two or more of these compounds.

Cyclohexane or alternatively methylcyclohexane, for example, may be used as aliphatic polymerization solvent.

The polymerization reaction may be carried out in the presence or absence of a polar agent of ether type, for example tetrahydrofuran, or of amine type, for example tetramethylethylenediamine.

This reaction may also be carried out in the presence of randomizing agents, such as sodium alcoholates.

The polymerization temperature may generally vary from about 0° C. to 90° C., and preferably from about 20° C. to 70° C.

If the diene elastomer to be prepared is a polybutadiene, the process according to the invention is such that each of the chain ends of the polybutadiene is provided with a butadienyl-lithium group.

It will be noted that the living diene elastomers obtained by this process of the invention may later be functionalized, by means of the carbon-lithium group which they bear at each chain end, so as to produce polymers which are effectively bifunctional.

It will also be noted that these living polymers thus obtained may be used for later polymerization, for example sequential polymerization or a grafting reaction, so as to result in triblock copolymers being obtained, the central block of which is formed of said diene elastomer and the end blocks of which are identical.

By way of example, in the case of a living polymer formed of polybutadiene, it is possible, for example, to prepare in this manner a styrene/butadiene/styrene copolymer (SBS) by grafting with a polymer formed of polystyrene. And in the case of a living polymer formed of polyisoprene, it is possible, for example, to prepare in this manner a styrene/isoprene/styrene copolymer (SIS) by analogous grafting.

EXAMPLES

In the examples which follow, 1,3-diisopropenylberizene (abbreviated to m-DIB hereafter) and secondary butyl-lithium (abbreviated to sBuLi) were used as first and second reagents, respectively.

These reagents were reacted in an inert atmosphere, in a stoppered flask or in a 10-liter reactor fitted with mechanical stirring means.

The diamines used, tetramethylethylenediamine (TMED) and tetraethylethylenediamine (TEED), were distilled before use.

All the initiators obtained were kept at low temperature (approximately −20° C.). Under these conditions, they may be stored for several months without loss of activity.

EXAMPLES OF PREPARATION OF INITIATORS A–F (EXAMPLES 1–6)

Example 1

Preparation of an Initiator A by Reaction Between m-DIB and sBuLi at −20° C., in the Presence of 1 Lithium Equivalent of Tetramethylethylenediamine (TMED)

14.3 ml of a 1.425 mol/l solution of sBuLi in cyclohexane is introduced into a stoppered flask containing 20 ml deaerated heptane. The reaction medium is brought to −50° C. At this temperature, 1.7 ml of m-DIB is introduced. The medium is kept under magnetic stirring for 10 minutes, then 3 ml of tetramethylethylenediamine is introduced. The start of the reaction upon the addition of the diamine results in an increase in the temperature to −20° C. The reaction medium is then kept at this temperature for 5 hours.

The strength of the solution is measured by Gilman dosing (article J. Am. Chem. Soc. 66, 1515, 1944). A strength of 0.52 mol/l is obtained, which corresponds to the desired strength.

Example 2

Preparation of an Initiator B by Reaction Between m-DIB and sBuLi at −20° C., in the Presence of 0.5 Lithium Equivalent of Tetramethylethylenediamine (TMED)

28.3 ml of a 1.415 mol/l solution of sBuLi in cyclohexane is introduced into a stoppered flask containing 45 ml deaerated heptane. The reaction medium is brought to −50° C. At this temperature, 3.4 ml of m-DIB is introduced. The medium is kept under magnetic stirring for 10 minutes, then 3 ml of tetramethylethylenediamine is introduced. The start of the reaction upon the addition of the diamine results in an increase in the temperature to −20° C. The reaction medium is then kept at this temperature for 1 hour.

The reaction medium is then left to stand for 12 hours in a freezer, at a temperature close to −20° C.

The strength of the solution is measured by Gilman dosing (article J. Am. Chem. Soc. 66, 1515, 1944). A strength of 0.5 mol/l is obtained, which corresponds to the desired strength.

Example 3

Preparation of an Initiator C by Reaction Between M-DIB and sBuLi at 50° C., in the Presence of 1 Lithium Equivalent of Tetramethylethylenediamine (TMED)

14.3 ml of a 1.425 mol/l solution of sBuLi in cyclohexane is introduced into a stoppered flask containing 21 ml deaerated heptane. The reaction medium is brought to 20° C. At this temperature, 1.7 ml of m-DIB is introduced. The medium is kept under magnetic stirring for 10 minutes, then 3 ml of tetramethylethylenediamine is introduced. The start of the reaction upon the addition of the diarnine results in an increased in the temperature to 50° C. The reaction medium is then kept at this temperature for 5 hours.

The strength of the solution is measured by Gilman dosing (article J. Am. Chem. Soc. 66, 1515, 1944). A strength of 0.53 mol/l is obtained, for 0.51 mol/l desired.

Example 4

Preparation of an Initiator D by Reaction Between M-DIR and sBuLi at 50° C., in the Presence of 0.5 Lithium Equivalent of Tetramethylethylenediamine (TMED)

The synthesis is effected in a 10 l reactor equipped with a mechanical stirring means.

2.7 l of a 1.38 mol/l solution of sBuLi in cyclohexane, then 318 ml of m-DIB, are introduced into the reactor containing 4.3 l deaerated heptane. The temperature of the reaction medium is measured at 28° C., the medium is stirred for 15 minutes, then 284 ml of tetramethylethylenediamine is introduced. The introduction of the diamine results in an increase in the temperature, and the reaction medium quickly reaches 50° C. This temperature is maintained for the 5 hours of reaction.

The strength of the solution is measured by Gilman dosing (article J. Am. Chem. Soc. 66, 1515, 1944). A strength of 0.47 mol/l is obtained, for 0.49 mol/l desired.

Example 5

Preparation of an Initiator E by Reaction Between m-DIB and sBuLi at Ambient Temperature, in the Presence of 0.5 Lithium Equivalent of Tetramethylethylenediamine (TMED)

14.3 ml of a 1.425 mol/l solution of sBuLi in cyclohexane, then 1.7 ml of m-DIB, are introduced into a stoppered flask containing 20 ml deaerated heptane. The temperature of the reaction medium is measured at 23° C., t he medium is kept under magnetic stirring for 10 minutes, then 1.5 ml of tetramethylethylenediamine is introduced. The introduction of the diamine results in a sudden increase in the temperature to 54° C., which then gradually drops again and stabilizes at 26° C. after about an hour. In total, the reaction medium is allowed to react for 5 hours.

The strength of the solution is measured by Gilman dosing (article J. Am. Chem. Soc. 66, 1515, 1944). A strength of 0.53 mol/l is obtained, for 0.54 mol/l desired.

Example 6

Preparation of an Initiator F by Reaction Between m-DIB and sBuLi at 50° C., in the Presence of 0.5 Lithium Equivalent of Tetraethylethylenediamine (TEED)

14.3 ml of a 1.425 mol/l solution of sBuLi in cyclohexane is introduced into a stoppered flask containing 21 ml deaerated heptane. The reaction medium is brought to −50° C. At this temperature, 1.7 ml of m-DIB is introduced. The medium is kept under magnetic stirring for 10 minutes, then 4.2 ml of tetraethylethylenediamine is introduced. The start of the reaction upon the addition of the diamine results in an increase in the temperature to −20° C. The reaction medium is then kept at this temperature for 1 hour.

The reaction medium is then left to stand for 12 hours in a refrigerator, at a temperature close to −20° C.

The strength of the solution is measured by Gilman dosing (article J. Am. Chem. Soc. 66, 1515, 1944). A strength of 0.5 mol/l is obtained, for 0.49 mol/l desired.

CHARACTERIZATION OF THE DILITHIATED INITIATORS A–F (EXAMPLES 1–6)

a) Search for Residual sBuLi:

The demonstration of residual sBuLi is effected after derivatization with 4,4-benzophenone (abbreviated to $Ph_2CO$ hereafter). The adduct $sBuLi/Ph_2CO$ is sought.

The derivatization reaction is carried out in the following manner.

A sample of the reaction medium to be characterized (comprising the bi-adduct m-DIB/2 sBuLi) is diluted to $\frac{1}{10}^{th}$ (volume/volume) in deaerated toluene, then is reacted for 1 hour at 60° C. with 1.5 lithium equivalent of $Ph_2CO$. The medium is then protonated by addition of a large excess of methanol.

The reaction mixture is then characterized by gas-phase chromatography.

The apparatus used is Model 5890 chromatograph sold by HEWLETT PACKARD.

b) Search for Residual m-DIB:

A sample of this reaction medium is protonated by addition of a large excess of methanol then analyzed by gas-phase chromatography.

The apparatus used is Model 6890 chromatograph sold by HEWLETT PACKARD.

c) Demonstration of the Formation of the Bi-adduct in a Majority Quantity (DIB/2 sBuLi):

A sample of the reaction medium is protonated by addition of a large excess of metanol, then analyzed by gas-phase chromatography, coupled with mass spectrometry (GPC/MS) using electron impact as ionization mode (EI), and also by direct introduction of the sample into the source of a mass spectrometer, using the two ionization modes electron impact (EI) and chemical ionization (CI) by ammonia gas, so as to demonstrate the oligomeric types formed by polymerization of the m-DIB.

The apparatus used for the GPC/MS analysis is Model MSD 5973 chromatograph sold by HEWLETT PACKARD; the analyses by direct introduction are effected on a Model R10 10-C mass spectrometer sold by NERMAG.

These analyses showed that the compound formed in a majority quantity is the bi-adduct DIB/2 sBuLi, of a molecular weight of 274 g/mol.

d) Quantitation of the Oligomeric Types:

The initiator is characterized by the technique of size exclusion chromatography (referred to as "SEC" technique).

The initiator to be analyzed is prepared as follows.

A sample of the aforementioned reaction medium is diluted to $\frac{1}{5}^{th}$ (volume/volume) in deaerated toluene, then is protonated by adding a large excess of methanol.

The sample is then washed neutral with water then the solvent is eliminated by estrainig using nitrogen.

The sample of initiator to be analyzed is solubilized in tetrahydrofuran, at a concentration of about 1g/l.

The apparatus used is a WATERS Model 150C chromatograph. The elution solvent is tetrahydrofuran, the flow rate is 1 ml/min., the temperature of the system is 35° C. and the duration of analysis is 40 min. The injected volume of the sample of initiator is 100 μl. The detector is a WATERS Model R401 differential refractometer, and the software for acquiring and processing the chromatographic data is the MILLENNIUM software sold by WATERS (version 2.10).

The standardization of the measuring apparatus is effected using polystyrene standards.

The percentage of oligomers formed is calculated by calculating the ratio of the area of the surface of the peaks corresponding to the different oligomeric types relative to the total area of the surface which is located beneath the curve of distribution of the molecular weights. The surfaces are provided by the software for processing the chromatographic data.

e) Results Obtained:

The table below summarizes all the results obtained for the characterization of said initiators A to F.

For each of the initiators, the amounts of sBuLi and residual m-DIB are expressed in percentages of the corresponding quantities which were introduced for the reaction. As for the amounts of oligomeric types resulting from the m-DIB, they are expressed in mass percent.

| Initiator | residual sBuLi | residual DIB | oligomeric types (SEC analysis) |
|---|---|---|---|
| A | 0.95% | 0.22% | ~7% |
| B | 1.4% | <0.04% | ~10% |
| C | 0.08% | <0.02% | ~5% |
| D | 0.13% | <0.02% | ~18% |
| E | 1.1% | 0.16% | ~13% |
| F | <0.014% | <0.02% | ~25% |

Figure 2:
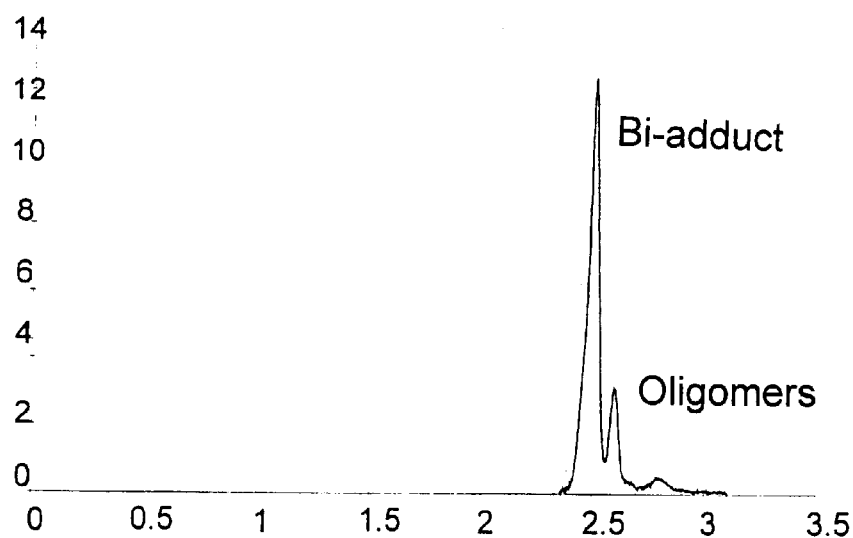
FIG. 2 is a graph illustrating the curve of distribution of molecular weights for another initiator prepared according to the invention.

By way of illustration, there are shown ion FIGS. 1 and 2 the curves of distribution of the molecular weights for the initiators B and F, the synthesis of which is described in Examples 2 and 6 respectively of section 1/.

The above table of results and these graphs show that the reaction between the m-DIB and the sBuLi is effectively oriented towards the formation of the bi-adduct (m-DIB/2 sBuLi). In fact, the amounts of residual sBuLi and m-DIB are very low (less for the most part than 1% of the quantity introduced) and the formation of oligomers of the m-DIB is limited to a mass fraction of from 5% to 25% according to the examples.

Consequently, the dilithiated initiators obtained by a process according to the invention are such that they are virtually exclusively formed of said bi-adduct.

COMPARATIVE EXAMPLES OF PREPARATION OF INITIATORS WHICH ARE NOT IN ACCORDANCE WITH THE INVENTION AND THEIR CHARACTERIZATION (COMPARATIVE EXAMPLES 7–8)

Example 7

Preparation of an Initiator G by Reaction Between m-DIB and Linear Butyllithium (n-BuLi) at −20° C. in the Presence of 1 Lithium Equivalent of Tetramethylethylenediamine (TMED)

This example is characterized by the same preparation conditions as in Example 1 above of section 1/, except for the fact that the secondary butyllithium has been replaced by linear butyllithium.

7.85 ml of a 2.6 mol/l solution of n-BuLi in cyclohexane is introduced into a stoppered flask containing 20 ml deaerated heptane. The reaction medium is brought to −50° C. At this temperature, 1.7 ml of m-DIB is introduced. The medium is kept under magnetic stirring for 10 minutes, then 3 ml of TMED is introduced. The start of the reaction upon the addition of the diamine results in an increase in the temperature to −20° C. The reaction medium is then kept at this temperature for 5 hours.

A heterogenous medium with presence of a precipitate is obtained.

Analysis by size exclusion chromatography (SEC) reveals the presence of insoluble types. The proportion of bi-adduct is evaluated at less than 5% by weight.

Consequently, this example shows that merely replacing the secondary butyllithium with its linear homologue, in the process for the preparation of an initiator according to the invention, orients the reaction between the m-DIB and the n-BuLi towards the formation of oligomeric types which are insoluble in the reaction medium. The reactivity of the n-BuLi is sufficient to lead to the formation of the bi-adduct, by addition to the unsaturated sites of the molecule of m-DIB.

Example 8

Preparation of an Initiator H by Reaction Between m-DIB and Secondary Butyllithium (sBuLi) at −20° C., in the Presence of 1 Lithium Equivalent of Triethylamine This example is characterized by the same preparation conditions as in Example 1 above. of section 1/, except for the fact that the tetramethylethylenediamine (TMED) has been replaced by triethylamine, which was distilled before use.

14.3 ml of a 1.425 mol/l solution of sBuLi in cyclohexane is introduced into a stoppered flask containing 20 ml of deaerated heptane. The reaction medium is brought to −50° C. At this temperature, 1.7 ml of m-DIB is introduced. The medium is kept under magnetic stirring for 10 minutes, then 2.84 ml of triethylamine is introduced. The start of the reaction upon the addition of the amine results in an increase in the temperature to −20° C. The reaction medium is then kept at this temperature for 5 hours.

Analysis by size exclusion chromatography (SEC) reveals the presence of oligomers in a large quantity (of the order of 50% by weight).

Consequently, this example shows that merely replacing the TMED with the triethylamine, in the process for the preparation of an initiator according to the invention, orients the reaction between the m-DIB and the sBuLi towards the formation of oligomers in a large quantity, which considerably reduces the purity of bi-adduct.

EXAMPLES OF PREPARATION OF LIVING POLYBUTADIENES BY MEANS OF INITIATORS ACCORDING TO THE INVENTION

Polybutadienes of low molecular weight (50,000 g/mol) comprising a butadienyl-lithium bond at each of the two ends of the polymer chain were prepared.

The following examples relate respectively to the use of initiators A to F according to the invention which were prepared in accordance with Examples 1 to 6.

The polymerization reactions were carried out in an inert atmosphere, in a stoppered flask, and each time implementing the following experimental protocol.

5 g of butadiene are introduced into 45 ml of deaerated cyclohexane. After compensation for the impurities supplied by the solvent and the monomer using n-butyllithium, a volume of dilithiated initiator corresponding to 200 μmol of carbon-lithium bonds is introduced. The polymerization is carried out at 60° C. After total conversion of the monomer, 1.2 ml of a 0.25 mol/l solution of chlorotrimethylsilane (ratio Si/Li=1.5) in cyclohexane is introduced. After 30 minutes, the polymer is protonated by addition of 2 ml of 2 mol/l solution of methanol in toluene. The polymer is antioxidized by addition of 2,2'-methylene bis-4methyl-6 tert. butylphenol (1 g per 100 g of monomer). The elastomer is then dried at 50° C. at reduced pressure.

CHARACTERIZATION OF THE POLYBUTADIENES OBTAINED a) Distribution of the Molecular Weights (DDM):

The polymers obtained were characterized by the technique of size exclusion chromatography (SEC technique). This technique consists in physically separating the macromolecules according to their size in the swollen state, on columns filled with a stationary phase. The macromolecules are separated by their hydrodynamic volume, with the most voluminous being the first to be eluted.

Without being an absolute method, the SEC technique, which uses a differential refractometer, constitutes a suitable tool for ascertaining the distribution of the molecular weights of a polymer. Using standard products whose characteristics are described in European Patent Specification EP-A-692 493, the number-average molecular weights (Mn) and weight-average molecular weights (Mw) are determined as described in said document, and the polydispersity index is calculated (Ip=Mw/Mn).

The sample of initiator to be analyzed is solubilized in tetrahydrofuran beforehand, at a concentration of about 1 g/l.

The apparatus used is a Model 150C WATERS chromatograph. The elution solvent is tetrahydrofuran, the flow rate is 1 ml/min., the temperature of the system is 35° C. and the duration of analysis is 30 min.

The injected volume of the sample of dilithiated initiator is 100 μl.

The detector is a WATERS Model R401 differential refractometer, and the software for processing the chromatographic data is the system sold by WATERS under the name MILLENNIUM (version 2.10).

b) Number-Average Molecular Weight (Mn) Determined by Osmometry:

The apparatus used is a Model Osmomat 090 osmometer sold by GONOTEC having a semi-permeable membrane. The polymer to be analyzed is dissolved in toluene, at a concentration of about 10 g/l. Measurement is effected at 50° C.

c) Demonstration of the Activity of Each of the Two C-Li Sites Borne by the Molecule of Initiator Upon Polymerization of the Butadiene:

For each of said initiators A to F, $^1$H NMR demonstrated the absence of non-active lithiated site upon polymerization of the butadiene, after functionalization of the ends of the chain with chlorotrimethylsilane (ClSiMe$_3$), which is a reagent known to react with carbon-lithium groups.

In fact, if a single chain end has been initiated, there are finally two functions of different nature at the two ends of the polymer chain, a first butadienyl-Li function and a second function corresponding to the lithiated site of the initiator (m-DIB-Li).

The demonstration of the activity of the C-Li sites is based on the fact that, after reaction with ClSiMe$_3$, the protons of the methyl groups resonate at different frequencies, depending on whether their environment is of the butadienyl type or of the m-DIB type.

The sample of polymer to be analyzed is prepared as follows.

The polymer obtained after reaction with ClSiMe$_3$, protonated with methanol and antioxidized by addition of 2,2'-methylene bis-4 methyl-6 tert. butylphenol is coagulated in methanol, then it is redissolved twice in toluene and in methanol to coagulate it. Then the polymer is dried at 50° C. at reduced pressure with nitrogen flushing.

$^1$H NMR analysis of the polymer is then performed in the following manner.

A sample of the polymer thus treated is solubilized in carbon disulphide. The $^1$H NMR signal is analyzed using a spectrometer marketed under the name "BRUKER AC200".

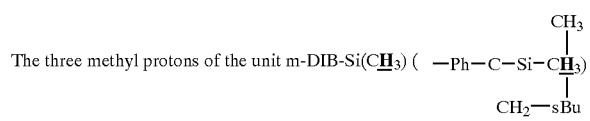

are characterized by a block towards −0.2 ppm. The three methyl protons of the butadienyl-Si(C$\underline{H}_3$) unit are characterized by a block between 0 and −0.1 ppm.

d) Results Obtained:

The table below summarizes all the results obtained for the characterization of the polybutadienes respectively prepared by means of said initiators A to F.

For each of the polybutadienes obtained, the number-average molecular weights Mn (g/mol) and the polydispersity index Ip (both determined by the SEC technique), the number-average molecular weight Mn$_{osmo}$ (measured by osmometry), and the amount by weight of vinyl determined by $^1$H NMR, in %) are indicated.

| Polybutadienes | Initiator | Mn (g/mol) (SEC technique) | Ip | Mn$_{osmo}$ (g/mol) (osometry) | Amount of vinyl linkages (%) |
|---|---|---|---|---|---|
| 1 | A | 42 208 | 1,07 | 50,000 | 68 |
| 2 | B | 43 118 | 1,07 | 50,000 | 53 |
| 3 | C | 42 405 | 1,1 | 50,000 | 68 |
| 4 | D | 43 256 | 1,09 | 50,000 | 53 |
| 5 | E | 43 897 | 1,06 | 52,000 | 52 |
| 6 | F | 45 262 | 1,08 | 55,000 | 44 |

For each of the polybutadienes 1 to 6, the functionalized units —Si(Me)$_3$ between 0 and −0.1 ppm were noted, which corresponds to the protons of the butadienyl-Si(CH$_3$) unit. No signal is detected in the zone of −0.2 ppm.

For each of these polybutadienes 1 to 6, the respective integrations of the aromatic lock centered at 7 ppm) and of the signal corresponding to the -Si(CH$_3$)$_2$ unit (block and −0.1 ppm) are indeed within the expected 0.5 ratio.

Figure 3:
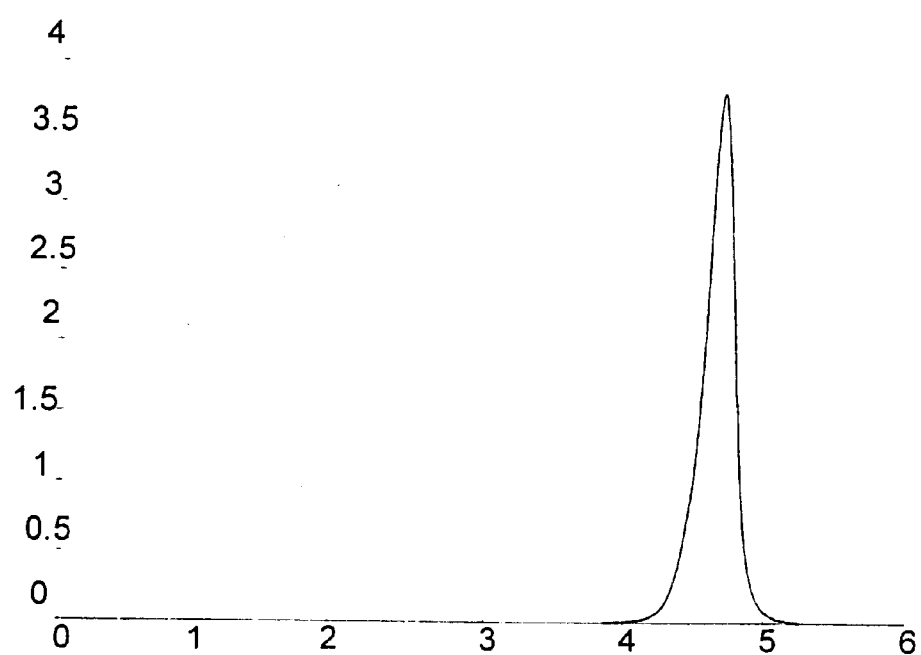
FIG. 3 is a graph illustrating the curve of distribution of molecular weights for an elastomer which is prepared by use of an initiator according to the invention.

By way of illustration, there is shown in FIG. 3 the curve of distribution of the molecular weights for the polybutadiene 3 synthesized from the initiator C.

In conclusion, it will be noted that each of the synthesized polymers has a number-average molecular weight Mn$_{osmo}$ measured by osmometry which is in accordance with the theoretical value. Furthermore, the distribution of the molecular weights is monomodal and narrow (Ip<1.1).

It will also be noted that the two sites present on the bi-adduct m-DIB/2 sBuLi are also active in polymerization. In fact, $^1$H NMR analysis of each of the polymers after functionalization of the chain ends, by reaction with chlorotrimethylsilane, showed that these sites are transformed into butadienyl-Li.

In summary, each of the initiators A to F according to the invention behaves like an effectively bifunctional initiator, in the sense of the equi-reactivity of the carbon-lithium sites borne by the molecule.

EXAMPLES OF PREPARATION OF STYRENE/BUTADIENE/STYRENE TRIBLOCK COPOLYMERS

Initiator D, the synthesis conditions of which are described in Example 4 of section 1/above, was used for the synthesis of a triblock styrene/butadiene/styrene copolymer (SBS), which has a polystyrene block at each of the chain ends.

As a comparison, the diblock butadiene/styrene copolymer of the same molecular weight was likewise synthesized, using n-butyllithium for the initiation.

The polymerization reactions were carried out in an inert atmosphere, in a 10-liter reactor provided with a mechanical stirring means.

a) Synthesis of the Triblock Copolymer:

201 g of butadiene are introduced into 4 litres of deaerated cyclohexane. After compensation for the impurities supplied by the solvent and the monomer using n-butyllithium, a volume of initiator corresponding to 4 mmol of carbon-lithium bonds is introduced. The polymerization of the polybutadiene block is effected at 60° C. After conversion of all the butadiene, 99 g of styrene are introduced, which is polymerized at 60° C. for 80 minutes. The copolymer is then protonated by addition of a large excess of methanol in solution in toluene, antioxidized by the addition of 2,2'-methylene bis(4-methyl-6-tert. butylphenol) (1 g per 100 g of monomer), then recovered by steam stripping and dried in an oven at reduced pressure at 60° C.

The polymer obtained has the following characteristics:

| | |
|---|---|
| Mn (g/mol) determined by osmometry: | 150,000 g/mol |
| Polydispersity index | 1.12 |
| Number of vinyl linkages (% by weight) | 40 |
| Amount of incorporated styrene (% by weight) | 32. | b) Synthesis of the Diblock Copolymer:

186 g of butadiene and 2.4 ml of a 0.5 M solution of tetramethylethylenediamine in cyclohexane is introduced into 4 litres of deaerated cyclohexane. After compensation for the impurities supplied by the solvent and the monomer using n-butyllithium, 3.7 ml of a 0.5 mol/l solution of n-butyllithium in cyclohexane is introduced. The polymerization of the polybutadiene block is effected at 60° C. After conversion of all the butadiene, 114 g of styrene is introduced, which is polymerized at 60° C. for 60 minutes. The copolymer is then protonated by addition of a large excess of methanol in solution in toluene, antioxidized by the addition of 2,2'- methylene bis(4-methyl-6-tert. butylphenol) (1 g per 100 g of monomer), then recovered by steam stripping and dried in an oven at reduced pressure at 60° C.

The polymer obtained has the following characteristics:

| | |
|---|---|
| Mn (g/mol) determined by osmometry: | 145,000 g/mol |
| Polydispersity index | 1.08 |
| Number of vinyl linkages (% by weight) | 39 |
| Amount of incorporated styrene (% by weight) | 33. |

MECHANICAL CHARACTERIZATION OF THESE STYRENE/BUTADIENE/STYRENE BLOCK COPOLYMERS

The table below summarizes the stress/elongation properties of the non-cross-linked SBS block copolymers, the synthesis of which is described in section 6/. For each of these copolymers there are indicated the apparent breaking stress (MPa), the deformation at break (in %), and the secant moduli SM at 10%, 50%, 100% and 300% deformation (MPa).

The measurements were carried out on an INSTRON Model 4501 machine at 23° C., at a traction rate of 1 m/min., on specimens of "dumbbell" type taken from polymer sheets of a thickness of 2.5 mm, moulded for 10 min. at 110° C. then cooled under a press for about twenty hours.

| | TRIBLOCK | DIBLOCK |
|---|---|---|
| Breaking stress (MPa) | 8.29 | 0.68 |
| Deformation at break (%) | 745.4 | 52.5 |
| SM 10% | 19.31 | 1.63 |
| SM 50% | 4.5 | 1.32 |
| SM 100% | 2.13 | 0.54 |
| SM 300% | 0.953 | 0.001 |

The copolymer obtained from the initiator according to the present invention has moduli which are significantly higher than those of the copolymer initiated with n-butyllithium. The levels of stress and elongation at break are also very superior.

In conclusion, the triblock structure of the copolymer formed from the initiator according to the invention should be insisted on, which, as mentioned in the preceding examples, demonstrates the perfectly bifunctional nature of said initiator in the sense of the equi-reactivity of the carbon-lithium sites borne by the molecule.

What is claimed is:

1. A process for the preparation of a dilithiated initiator usable in anionic polymerization, said process comprising:
   reacting a dialkenyl benzene bearing two double bonds and secondary butyllithium, in the presence of a diamine, in an aliphatic or alicyclic hydrocarbon solvent,
   such that the ratio of the number of moles of dialkenyl benzene to the number of moles of secondary butyllithium is substantially equal to 0.5 to form the dilithiated initiator,
   wherein said initiator is a bi-adduct having a molecule of the secondary butyllithium added to each of the two double bonds of the dialkenyl benzene.

2. The process of claim 1, wherein said diamine is introduced into a reaction mixture comprising the dialkenyl benzene and secondary butyl lithium.

3. The process of claim 1, wherein dialkenyl benzene is added in its entirety to the secondary butyllithium in a single step.

4. The process of claim 1, wherein the quantity of diamine is between about 0.5 to 1 lithium equivalent.

5. The process of claim 4, wherein the quantity of diamine is substantially equal to 1 lithium equivalent.

6. The process of claim 1, wherein diamine is selected from the group consisting of tetramethylethylenediamine and tetraethylethylenediamine.

7. The process of claim 6, wherein said diamine is tetramethylethylenediamine.

8. The process of claim 7, comprising reacting the dialkenyl benzene and secondary butyllithium at a temperature from about −20° C. to 50° C.

9. The process of claim 6, wherein said diamine is tetraethylethylenediamine.

10. The process of claim 9, comprising reacting the dialkenyl benzene and secondary butyllithium at a temperature from about −20° C. to 50° C.

11. A process for the preparation by anionic polymerization of a living diene elastomer which is provided with a carbon-lithium group at each of the chain ends thereof, said process comprising:
    reacting, in an aliphatic or alicyclic hydrocarbon solvent, at least one conjugated diene monomer with a dilithiated initiator, wherein said dilithiated initiator is obtained by reacting a dialkenyl benzene bearing two double bonds and secondary butyllithium, in the presence of a diamine, in an aliphatic or alicyclic hydrocarbon solvent, such that the ratio of the number of moles of dialkenyl benzene to the number of moles of secondary butyllithium is substantially equal to 0.5, to form the dilithiated initiator, said initiator being a bi-adduct having a molecule of the secondary butyllithium added to each of the two double bonds of the dialkenyl benzene, wherein the lithium groups of said initiator are equireactive during polymerization.

12. The process of claim 11, wherein said diene elastomer is a polybutadiene, having a butadienyl-lithium group at each of the chain ends of said elastomer.

13. A process for the preparation of a copolymer having three blocks, the central block of which comprises a diene elastomer and the end blocks of which are identical, comprising:

a) preparing by anionic polymerization a living diene elastomer which is provided with a carbon-lithium group at each of the chain ends thereof comprising reacting, in an aliphatic or alicyclic hydrocarbon solvent, at least one conjugated diene monomer with a dilithiated initiator, wherein said dilithiated initiator is obtained by reacting a dialkenyl benzene bearing two double bonds and secondary butyllithium, in the presence of a diamine, in an aliphatic or alicyclic hydrocarbon solvent, such that the ratio of the number of moles of dialkenyl benzene to the number of moles of secondary butyllithium is substantially equal to 0.5, to form a dilithiated initiator, said initiator being a bi-adduct having a molecule of the secondary butyllithium added to each of the two double bonds of the dialkenyl benzene, wherein the lithium groups of said initiator are equireactive during polymerization, and b) grafting a polymer that comprises each of said end blocks on to said living diene elastomer.

14. The process of claim 13, wherein said diene elastomer is a polybufatadiene and said polymer is polystyrene such that the copolymer obtained comprises three styrene/butadiene/styrene blocks.

15. The process of claim 13, wherein said diene elastomer is a polyisoprene and said polymer is polystyrene such that the copolymer obtained comprises three styrene/isoprene/styrene blocks.

* * * * *

UNITED STATES PATENT AND TRADEMARK OFFICE
CERTIFICATE OF CORRECTION

PATENT NO.    : 6,562,923 B1
DATED         : May 13, 2003
INVENTOR(S)   : Robert et al.

It is certified that error appears in the above-identified patent and that said Letters Patent is hereby corrected as shown below:

Title page,
Item [56], References Cited, OTHER PUBLICATIONS, under "IPC Business Press," "*secbutylithium*" should read -- *sec-butyllithium* --
Item [57], ABSTRACT,
Line 9, "of" should be deleted Column 5,
Line 6, "a" should read -- is a --
Line 45, "1,3-diisopropenylberizene" should read -- 1,3-diisopropenylbenzene --

Column 6,
Line 48, "diarnine" should read -- diamine --

Column 7,
Line 19, "t he" should read -- the --

Column 8,
Line 11, "(DIB/2 sBuLi):" should read -- (m-DIB/2 sBuLi): --
Line 13, "metanol," should read -- methanol, --
Line 27, "DIB/2 sBuLi" should read -- m-DIB/2 sBuLi --
Line 38, "estraining" should read -- entraining --

Column 9,
Table, "DIB" should read -- m-DIB --
Line 12, "ion" should read -- in --
Line 15, "of section 1/" should be deleted
Line 41, "of section 1/" should be deleted Column 10,
Line 8, "above." should read -- above --
Line 8, "of section 1/" should be deleted
Line 56, "bis-4methyl-6" should read -- bis-4 methyl-6 --

Column 12,
Line 3, Formula and text should be in normal-sized font
Line 10, "d)Results Obtained" should read -- d) Results Obtained --
Table, "(osometry)" should read -- (osmometry) --
Table, "," (comma—all occurrences) should read -- . -- (decimal point)
Line 64, "section 1/above" should read -- section 1/ above --
Line 64, "of section 1/" should be deleted

UNITED STATES PATENT AND TRADEMARK OFFICE
CERTIFICATE OF CORRECTION

PATENT NO. : 6,562,923 B1
DATED : May 13, 2003
INVENTOR(S) : Robert et al.

It is certified that error appears in the above-identified patent and that said Letters Patent is hereby corrected as shown below:

<u>Column 13,</u>
Line 41, "2,2'- methylene" should read -- 2,2'-methylene --
Line 55, "in section 6/." should read -- above. --

<u>Column 16,</u>
Line 16, "on to" should read -- onto --
Line 18, "polybufatadiene" should read -- polybutadiene --

Signed and Sealed this

Twenty-fifth Day of November, 2003

JAMES E. ROGAN
*Director of the United States Patent and Trademark Office*